A. N. Henderson.
Lamp Burner.
N° 38,742.   Patented Jun. 2, 1863.
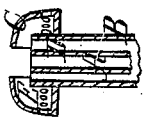
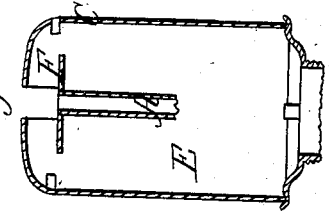
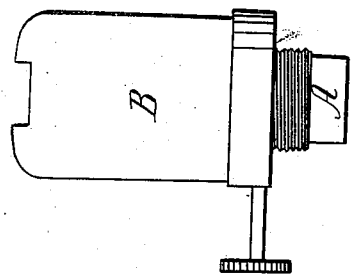
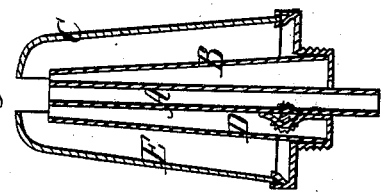
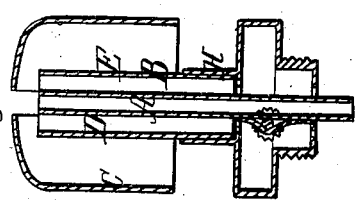
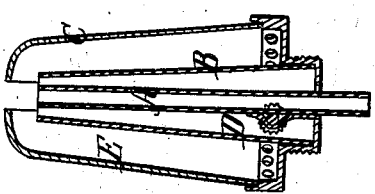
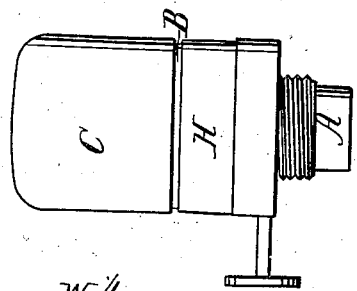
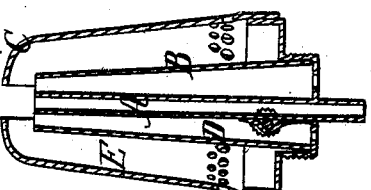
Witnesses:
B Vanfleet
Thos H Vanstook
Inventor;
Albert N Henderson

UNITED STATES PATENT OFFICE.

ALBERT N. HENDERSON, OF BUFFALO, NEW YORK.

LAMP-BURNER.

Specification of Letters Patent No. 38,742, dated June 2, 1863.

*To all whom it may concern:*

Be it known that I, ALBERT N. HENDERSON, of Buffalo, county of Erie, and State of New York, have invented a new and useful Lamp-Burner for Consuming Kerosene and Kindred Oils Without a Chimney and Without Smoke or Unpleasant Odor, and do hereby declare the following to be a full, clear, and exact description thereof, reference being had to the annexed drawings, and to the letters of reference marked thereon, making a part of this specification, wherein—

Figure 1 is a perspective view; Fig. 2, a vertical section and Figs. 3, 4, 5, 6, 7 and 8 illustrations of modifications thereof.

The object of this invention is to apply to lamps of various sizes the same distinctive feature patented to me Feb. 17, 1863, to wit, to surround the wick tube with another tube, so as to leave a space, air tight except at the top, for all surplus oil, and all defectively rarefied gas and smoke from the flame to sink into and fall through small holes into the body of the lamp, this space being an eighth of an inch more or less according to the size of the lamp at the sides of the flame and proportionably more at its edges according to the width of the flame desired. In combination with these tubes I add an outer cap of metal, glass or other material either open at its bottom or perforated with one or more rows of small holes so as to admit air and so constructed as to throw this air at right angles against the base of the flame.

In the accompanying drawings A represents the wick tube, made in the ordinary way; B the middle tube inclosing the isolated air; D the space for the surplus oil and defectively rarefied gas and smoke to fall into having no air holes at its bottom; E the space for the current of outer air to ascend to the flame; C the outer tube or cap either open at bottom or closed and perforated with small holes and in some of the modifications having open side slots and in others small holes near the top to aid in throwing the air at right angles against the flame.

In one of the modifications F is a plate on the top of the wick tube. G represents the small holes communicating from the isolated air space to the body of the lamp. H is the socket to hold the tube B, or it may be soldered the top of the lamp.

The mode of operation is, that when this lamp is lighted all the surplus oil and defectively rarefied gas and smoke which ordinarily infects the air of apartments, sinks into the isolated space D a portion whereof is heated rarefied and rises to feed the flame which thereby spreads out into a square, wide form of great brilliancy, and the remainder of the oil gas and smoke sinks back into the reservoir, to rise again to the flame.

This lamp burner is intended either for lamps for ordinary use or for lanterns or railway headlights.

I claim as my invention and desire to secure by Letters Patent—

1. The isolated space D open at the top around the flame, without air holes around the bottom but with small holes connecting with the oil reservoir constructed in the manner and for the purpose described and represented.

2. I claim the said isolated air space in combination with the outer ascending air space E with the various modifications of the cap for the formation thereof so constructed as to admit the air as herein described and in some of the forms at the top also, so as to throw it at right angles against the flame and in further combination with these devices the plate F now in use in other forms of lamps all constructed in the manner and for the purposes herein substantially described and set forth.

ALBERT N. HENDERSON.

Witnesses:
B. VANFLEET,
JNO W. VAN HOOK.